Dec. 27, 1927.
H. B. STEIN
1,653,788
WINDOW CONSTRUCTION
Filed April 28, 1927 — 6 Sheets-Sheet 1
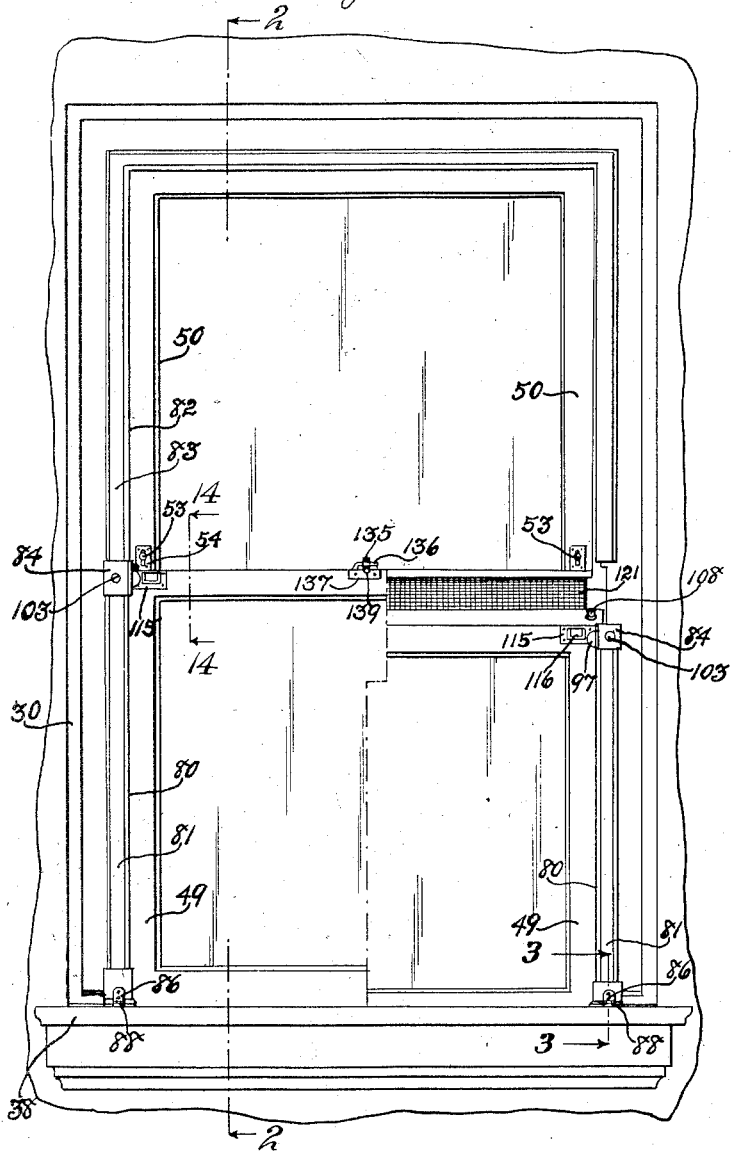
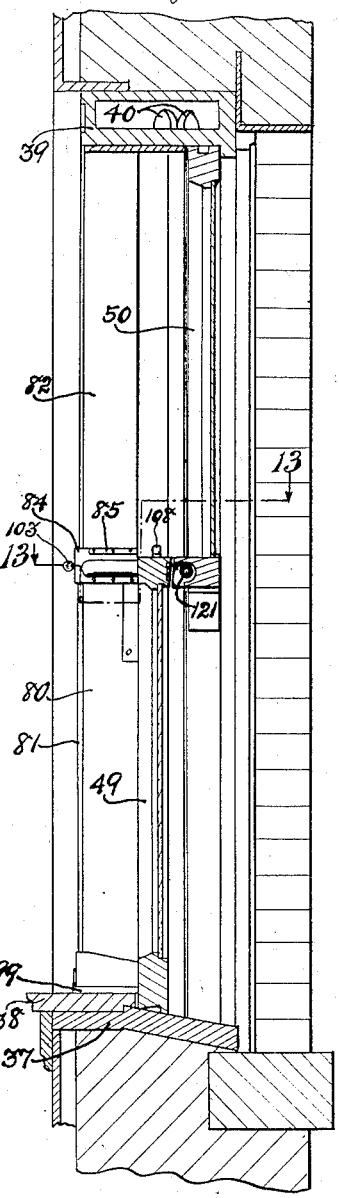
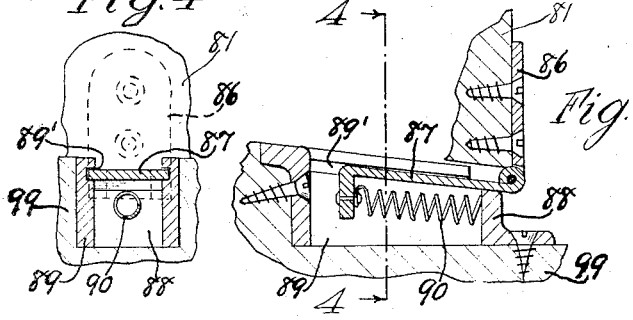
Inventor
Harry B. Stein
by J. Daniel Stuwe
Attorney.

Dec. 27, 1927.  1,653,788
H. B. STEIN
WINDOW CONSTRUCTION
Filed April 28, 1927    6 Sheets-Sheet 2

Inventor
Harry B. Stein
by J. Daniel Stuwe
Attorney.

Dec. 27, 1927.
H. B. STEIN
1,653,788
WINDOW CONSTRUCTION
Filed April 28, 1927    6 Sheets-Sheet 3
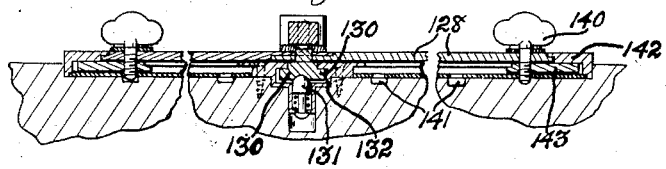
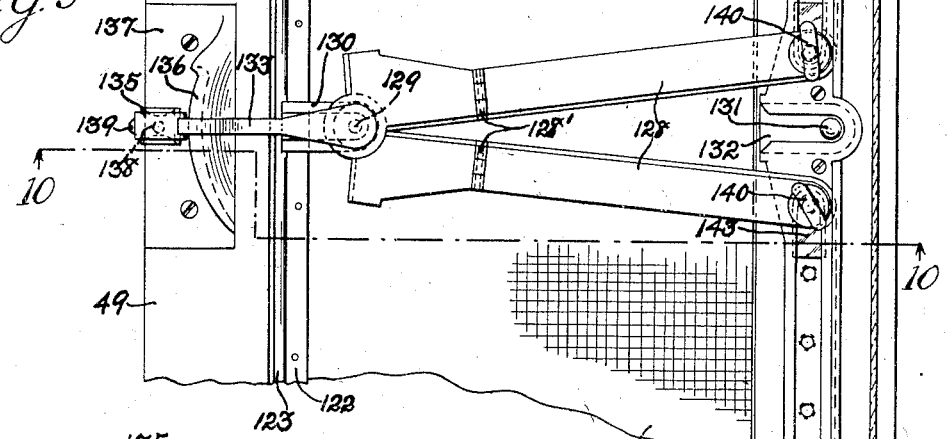
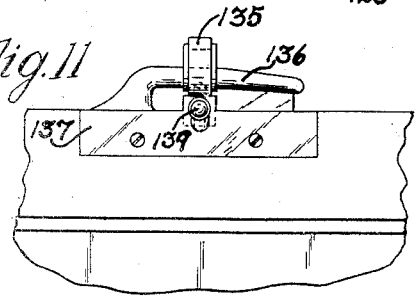
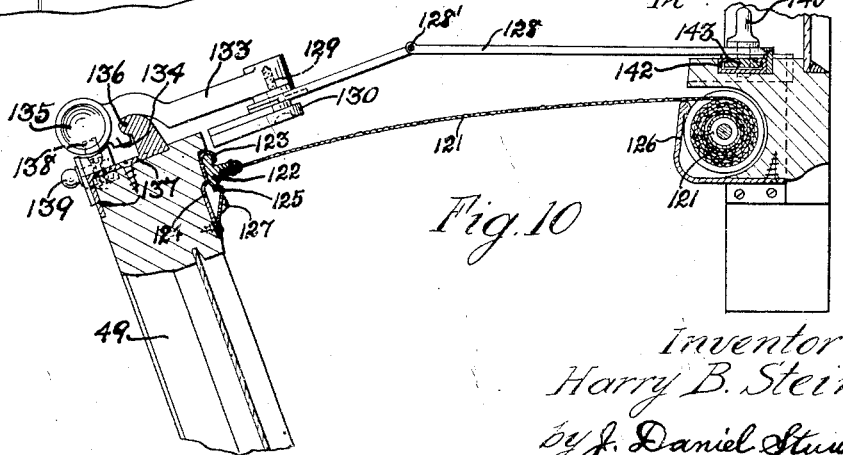
Inventor
Harry B. Stein
by J. Daniel Stuwe
Attorney.

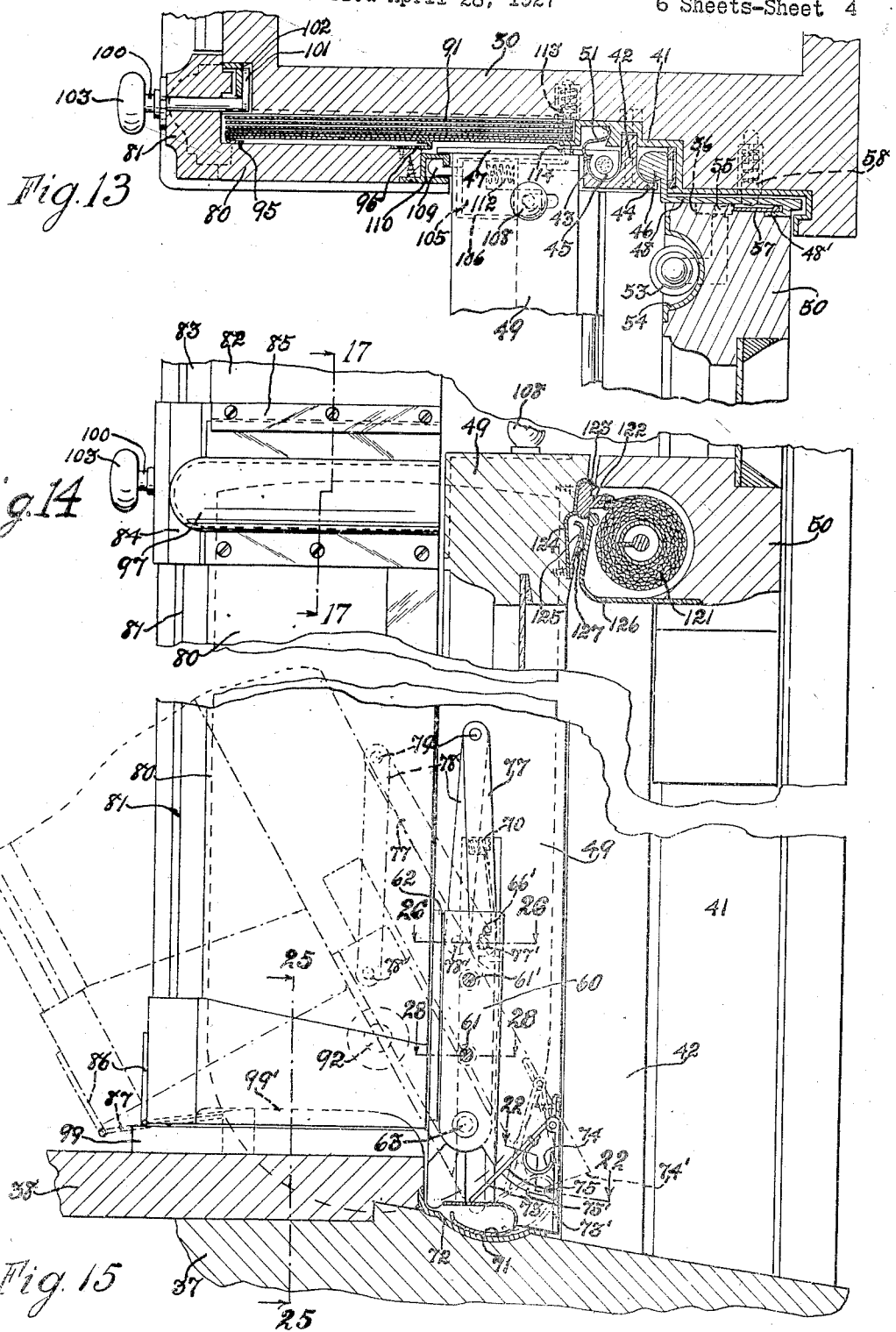

Dec. 27, 1927.
H. B. STEIN
1,653,788
WINDOW CONSTRUCTION
Filed April 28, 1927    6 Sheets-Sheet 5
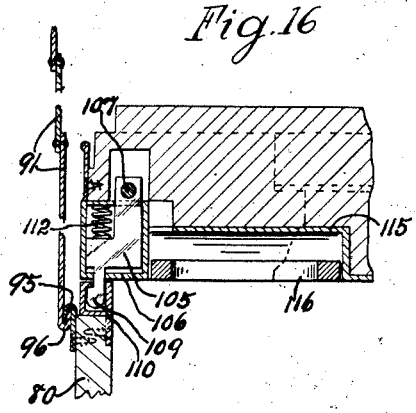
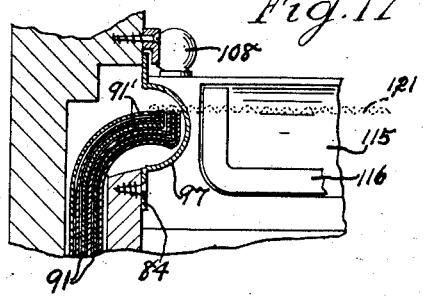
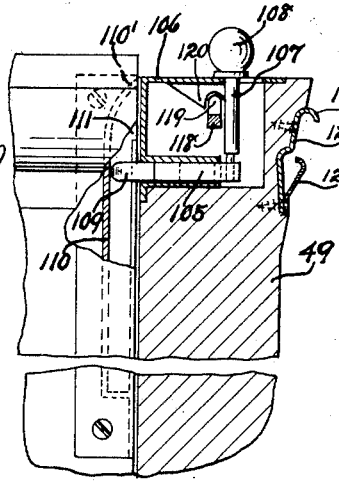
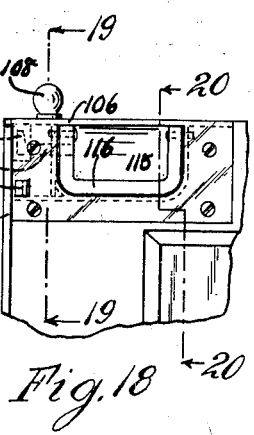
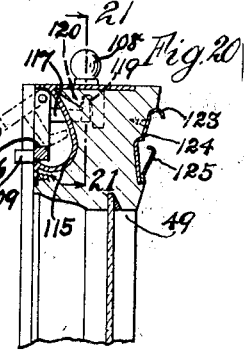
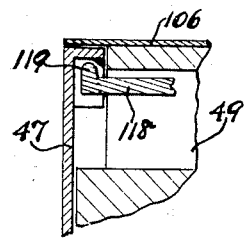
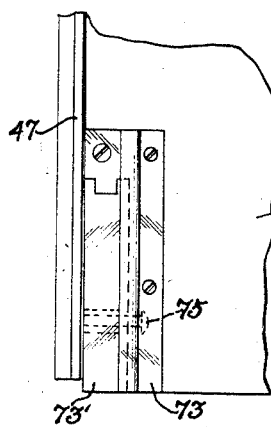
Inventor
Harry B. Stein
by J. Daniel Stuwe
Attorney Dec. 27, 1927.
H. B. STEIN
1,653,788
WINDOW CONSTRUCTION
Filed April 28, 1927
6 Sheets-Sheet 6
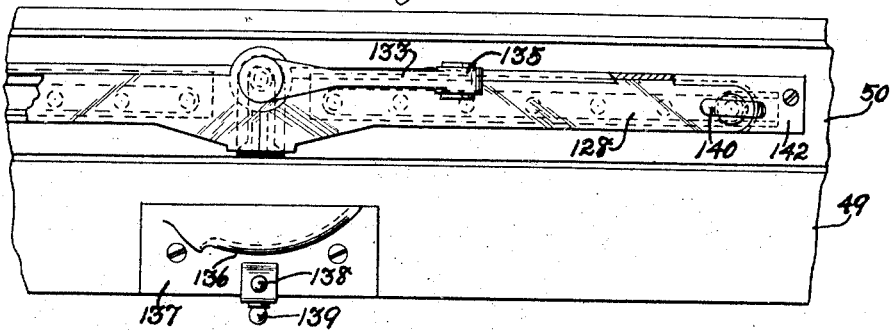
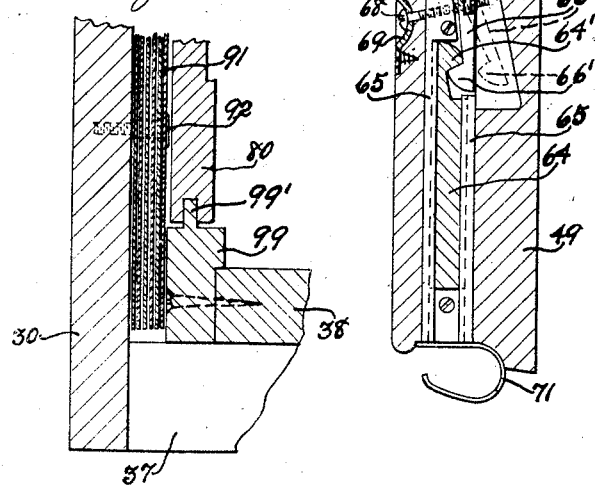
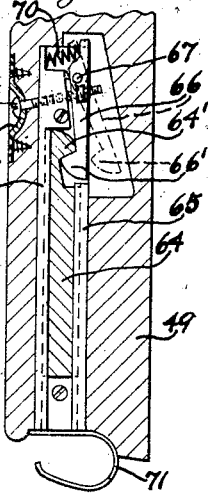
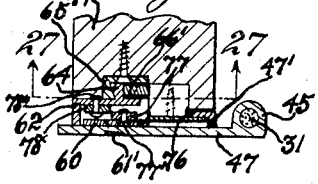
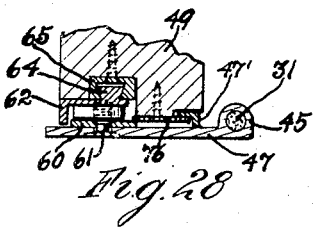
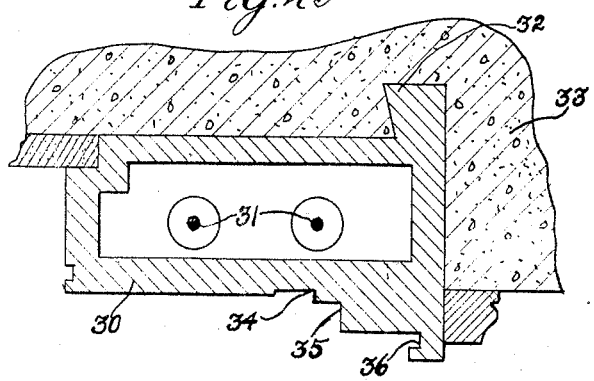
Inventor
Harry B. Stein
by J. Daniel Stuwe
Attorney.

Patented Dec. 27, 1927.

1,653,788

UNITED STATES PATENT OFFICE.

HARRY B. STEIN, OF CHICAGO, ILLINOIS.

WINDOW CONSTRUCTION.

Application filed April 28, 1927. Serial No. 187,374.

My invention relates to window construction, and more particularly to a combination construction for mounting the sash slidably and swingably in the window frame.

The main object of the invention is to provide means and mechanisms for mounting the window sashes so that they may be slid vertically in the frame, in the usual manner; and may also be swung away from the frame or into the room, in order to serve the purpose of a window shield, thus adapting this construction especially for use in hospitals, sick rooms, homes and apartments, office buildings and public institutions, etc. A further object is to provide means for swingably mounting a sash and means thereon for covering the openings at the sides of the sash when it is swung open. Another object is to provide means for screening the main opening and to fold or roll and to unroll automatically by the swinging of the sash. A further object is to provide means for covering the side openings of a swinging sash, and means for screening the opening at the free end of said sash, automatically as the sash is swung open. Still another object is to provide means for automatically connecting the screen to the sash to move therewith as the sash is swung open, and which means will automatically release said screen from the sash as the sash is slid vertically in the frame. Another object is to provide a construction with sash partition means and shield plates slidable with the sash along said partition means for keeping out wind and weather and concealing the cables, and also to provide stops with fan shields swingable with the sash into the room and serve as a window shield at the bottom of the window, and to provide catches and pivot means for fastening said shield plates to the sash to slide therewith in the frame while the stops and fan shield remain idle, or to hold said shield plates and to connect said stops and fan shields to the sash to move therewith when said sash is swung in the frame. And another object is to provide a handle with a catch for locking the sash and arranged to automatically release said catch by grasping said handle for opening said sash. And a further object is to provide friction hinge means for holding the sash in various positions.

Other objects and advantageous ends are attained with my invention, as will become apparent from the following description, taken in connection with the accompanying drawings, in which, Fig. 1 is a combination view showing my window construction in elevation, and the sash closed at the top and the lower left-hand, but partly open at the lower right-hand of the window;

Fig. 2 is a vertical cross-section on line 2—2 of Fig. 1, showing the parts in closed position;

Fig. 3 is an enlarged vertical detail section on line 3—3 of Fig. 1;

Fig. 4 is a vertical section on line 4—4 of Fig. 3;

Fig. 9 is a plan view of the locking means between the two sashes;

Fig. 10 is a vertical section on line 10—10 of Fig. 9;

Fig. 11 is an end view of this locking means;

Fig. 12 is substantially a vertical section on line 12—12 of Fig. 9, but showing this locking means in the sash-closed position;

Fig. 13 is an enlarged horizontal section on line 13—13 of Fig. 2;

Fig. 14 is an enlarged vertical section on line 14—14 of Fig. 1;

Fig. 15 is a detail view of the friction hinge means for the sash;

Fig. 16 is an enlarged horizontal section on line 16—16 of Fig. 5;

Fig. 17 is a vertical section on line 17—17 of Fig. 14;

Fig. 18 is a detail elevation of the handle and locking catches on the lower sash;

Figure 5:
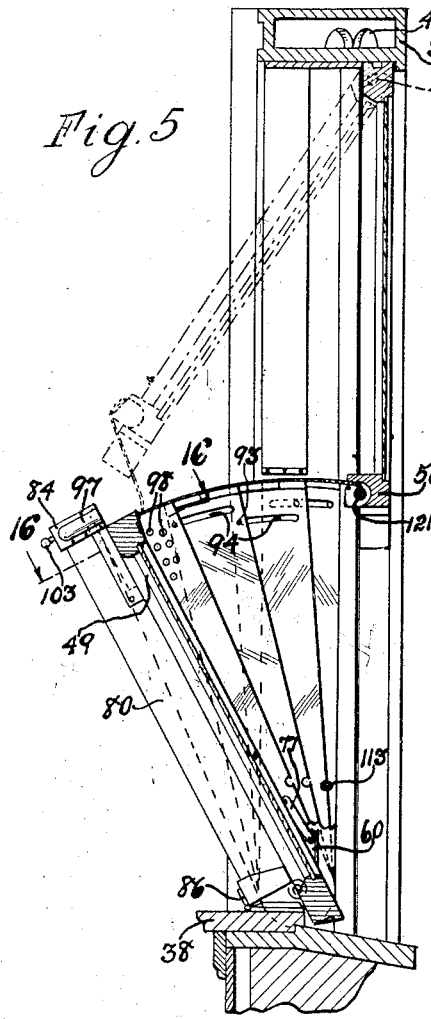
Fig. 5 is a vertical cross-section showing the lower sash with the fan shield and screen swung partly open, and indicating in dot-and-dash lines that the upper sash is also swingably mounted.
Figure 6:
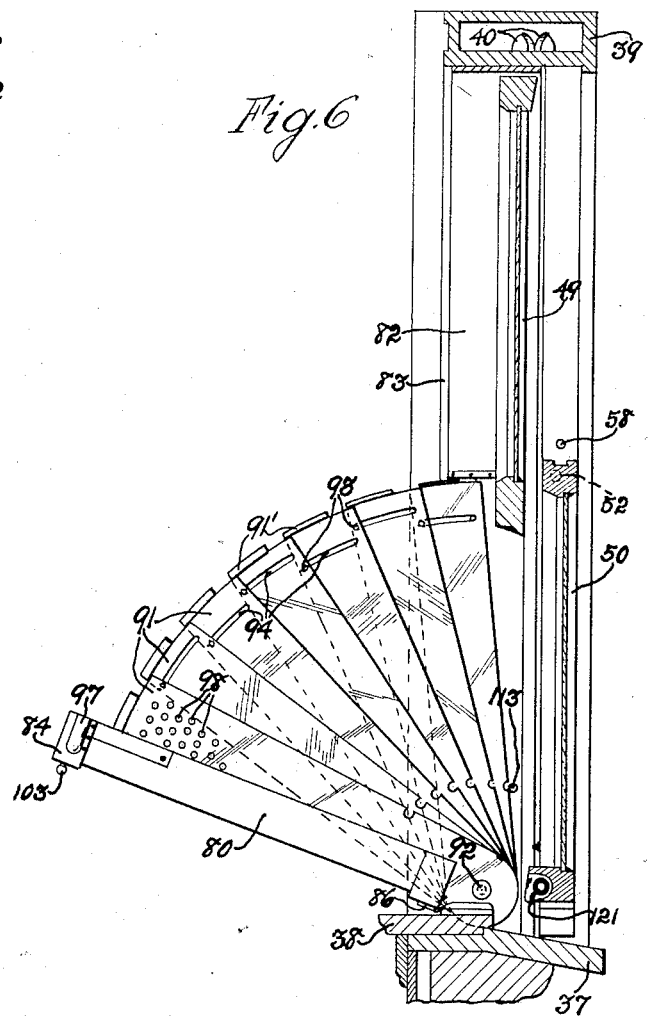
Fig. 6 is a vertical cross-section showing the fan shield fully extended, and the two sashes slid out of their usual positions, while the screen is rolled up in the meeting rail of the upper sash.

Figs. 19 and 20 are vertical cross-sections, respectively, on lines 19—19 and 20—20 of Fig. 13, Fig. 19 being enlarged;

Fig. 21 is an enlarged section on line 21—21 of Fig. 20;

Fig. 22 is an enlarged section on line 22—22 of Fig. 15;

Fig. 23 is a detail view, from the outside of the window;

Fig. 24 is a plan view of the locking means between the sashes, arranged to permit sliding of one sash alongside the other;

Figs. 25, 26 and 28 are detail sections on lines 25—25, 26—26, and 28—28, respectively, of Fig. 15;

Fig. 27 is a section on line 27—27 of Fig. 26; and

Fig. 29 is a detail section showing the anchoring of the side frame member in the wall of a building.

In the drawings I have shown the invention embodied in a certain form of construction, this, of course, is modified or varied to suit the particular occasion and particular type and size of building to be equipped. This construction shown comprises side frame members or jambs 30 which are hollow or box-like, (see Fig. 29) to house the cables 31 and the weights, and these jambs have dove-tail or ledge means 32 for anchoring them in the wall 33 of a building. These hollow jambs also have the window sash adjoining sides rabbeted and stepped, as indicated at 34 and 35 and 36, in order to receive means or mechanism for mounting sashes of different widths therein, so that the sashes can be slid vertically in the frame members or jambs, and can also be swung transversely therein. Said members have a window sill 37 and stool 38 at the lower end, and a box-header or hollow lintel 39 at the top wherein are mounted diverging pulleys 40 over which pass the cables 31 into said frame members, to have said cables and pulleys entirely concealed at all times, as more fully disclosed and claimed in my United States Patent No. 1,625,289, dated April 19, 1927, for window hanging device.

My partition means includes a stepped plate or casing member 41 which fits in the rabbeted and stepped parts 34, 35, and 36 of the hollow side frame or jamb 30, and a partition strip 42 removably mounted thereon with screws or suitable elements, as best shown in Fig. 13. This strip has an inward flange 43 and an outward flange 44 which cooperate with member 41 to form an inward chamber and an outward chamber for concealing the cables 31 and slidably enclosing the rounded, rod-like side edges 45 and 46 of shield plates 47 and 48, attached to said cables, and positioned respectively, at the sides of the lower or inward sash 49, and the upper or outward sash 50. Curved spring members or strips 51 are also mounted in these chambers to cooperate with said shield plates and partition means for keeping out wind and weather, as disclosed and claimed in my said Patent No. 1,625,289. Said Fig. 13 shows that this stepped construction provides for the use of sashes of different widths, and that the upper or outward sash 50 is the narrower one, permitting it to be swung between the partition strips 42 into the room.

Figures 7, 8:
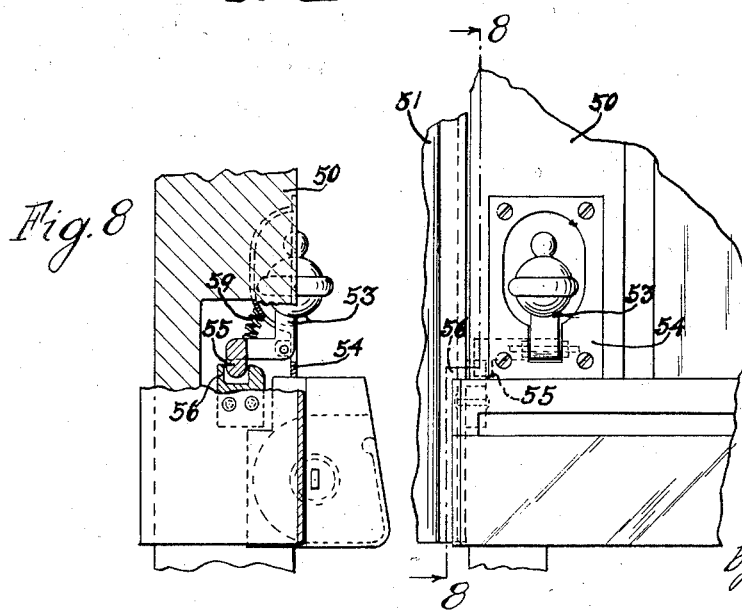
Fig. 7 is a detail elevation of the locking latch on the upper sash.
Fig. 8 is a section thereof, taken on line 8—8 of Fig. 7.

My invention comprises means for mounting both sashes in the frame so as to slide therein with the shield plates, and also to swing in said plates and in the frame. This means may be the same for both sashes, or may be of different construction, as indicated in this application. Said means for mounting the upper sash 50 may include pivot means 52, (see Fig. 5) between the upper rail and the plates 48, for swinging said sash between strips 42 into the room; and a lever 53 mounted with a housing or casing 54 in a suitable notch in the side rail of said sash, and having a catch or hook 55 to engage a lug 56 on shield plate 48. (See Figs. 7, 8, and 13.) By grasping the ball-head of this lever to draw it from its housing, the catch 55 is automatically raised from lug 56 and the sash is readily swung on pivot means 52 into the room. A plate 57 on the side of the sash catches behind a flange 48' on plate 48, when said sash is returned into vertical position, to form a weather-tight fit. A friction catch 58 in frame member 30 is provided to engage in a notch in said shield plate, for yieldably retaining said plate and the attached sash in position and against too free sliding movement in the frame. A spring 59 normally holds catch 55 in its locking position.

The means provided, in the disclosed construction, for slidably and swingably mounting the lower sash 49 comprises hinge means including an outer plate or bar 60 fastened with rivets or elements 61 and 61' to the inner side of each shield plate 47, as best shown in Figs. 15, 26 and 28. Said means also includes a flanged plate or bar 62 fulcrumed on plate 60 with a pivot element 63, and having a dove-tailed rib or flange 64 thereon which is slidably mounted in a groove formed in a block 65 set into the side edge of the sash and fastened thereto with screws or the like. This rib 64 has an upper hook 64' which is engaged by a hook 66' on a lever 66 fulcrumed on a pivot 67 in the sash. A screw 68 passes through a dished plate or washer 69 fastened at the front or inward side of the sash, and through block 65 into lever 66, so that by operating this screw 68 the lever can be swung to clasp or unclasp its hook 66' with the hook 64', urged together by a spring 70; and when this lever and hook are swung back, into the dot-and-dash position of Fig. 27, then the sash can be slid, with its block 65, away from rib 64 and the connected plates 62, 60, and 47; thus providing means for readily lifting and removing the sash out from the frame members and connected elements. A curved spring strip 71 at the bottom of the sash provides a weather-tight fit with the sill 37, or the plate 72 when provided thereon, during the closed and various open positions of the sash. Pivotally connected plates 73 and 73' are preferably mounted in the lower outside corners of this sash, as shown in Figs. 15 and 22, for clearing the partition strips 42, during swinging of the sash. Note the position of the lower edge 74' of the intermediate part of this sash swung, in dot-and-dash lines in Fig. 15. A spring 74 urges these plates apart, and a guide pin 75 and slot 75' guides their travel. A plate 76 is fastened on the sash and engages under a flange 47' on shield plate 47, to provide a doubly weather-tight connection, between the sash and the frame members.

My hinge means is also provided with friction means for retaining the sash in various positions of opening, and this means preferably includes a link 77 pivotally and frictionally connected with an element 77' to plate 60, and a link 78 similarly connected with an element 78' to plate 62, said links being also frictionally connected together by an element 79. These links are positioned between plates 60 and 62, as best shown in Figs. 15 and 26, and are concealed behind the inward flange on plate 62, in the room.

Along with the swingable sash I also provide a swingable stop 80 which is connected to or made integral with the front casing portion or moulding strip 81, both extending the height of the lower sash; while the stop 82 and the moulding strip 83, which extend along the upper sash, are preferably fixed or stationary on the frame. A covering member or hood 84, which is attached to swingable members 80 and 81, conceals the dividing line between these lower swingable members and the upper stationary members 82 and 83, and the upper edge of said hood slides under a guide flange 85 on stop 82, in closing the sash.

The hinge means for swinging the stop 80 and strip 81 comprises a leaf hinge having a leaf or strap 86 fastened to strip 81, and a leaf 87 slidable over the end wall 88 of a box 89 and in slots 89' in the side walls of the box, as best shown in Figs. 3 and 4; said box being set into a bar 99 on window stool 38. This means thus permits swinging of the stop and strip, and also sliding of the lower ends thereof, inward into the room, to compensate for the relative inward movement of the lower end of the swinging sash 49, as best indicated in Fig. 15. A spring 90, between wall 88 and the end of leaf 87, resiliently holds and draws said hinge means and stop in proper position.

I further provide shielding means for closing the openings at the sides of the swung sash, and this means preferably comprises a fan mechanism placed at each side of the sash and including a number of plates 91 connected by a lower pivot pin 92 and by upper pins 93 moving in slots 94 in said plates, so as to fold and unfold with the swinging of the sash and stop. The inner plate has a hook 95 which is engaged by a hook 96 on stop 80 for spreading or unfolding these fan plates. The upper ends 91' of these plates are curved inward, as best shown in Fig. 17, and in the closed position are concealed by a curved part or trough 97 on covering member 84. These plates will also be provided with perforations 98 wherever desired. As the sash and stops and plates are swung open, the grooved bottom edge of each stop slides on a guide rib 99' provided on a bar 99 fastened to window stool 38, as shown in Figs. 15 and 25.

The means for locking the stop, and thereby the fan and sash, against swinging movement comprises a locking bolt 100 extending through the stop and having a locking finger 101 engageable behind a lug 102 on frame member 30, by turning knob 103 provided on the bolt.

The means provided for fastening the sash to the stop to force combined swinging thereof comprises a latch 105 slidable in a casing 106 mounted in a notch in the meeting rail of sash 49, movable by a stem 107 and knob 108 thereon. A hook 109 on said latch engages behind a flange on a channel member 110, (see Figs. 13, 16 and 19) and slides vertically therein, as the sash is lifted, to be forced out from said member, through an upper opening 111 thereon, by means of the curved top wall 110' of the member. A spring 112 urges the hook into this channel member. When the sash is being raised this hook slides along the side edge of the upper fixed stop 82, while the lower stop 80 and the fan remain stationary, and free to swing without the sash; then as the sash is dropped this hook automatically moves through opening 111 into channel member 110, to force the sash to swing with the stop.

Due to this construction, and of elements 60 to 70, (see Figs. 26, 27 and 28,) the sash 49 and its shield plates 47 slide together vertically along the partition members 41 and 42; and when the sash is lowered it can be swung on its fulcrum or pivot 63 within these plates 47; while a spring-pressed friction catch 113 in frame member 30 engages in a hole 114 in said plate to retain it in position, and when the sash is swung then this catch is pressed by its spring fully into said hole to extend through the plate and lock it burglar-proof against vertical sliding movement in the frame, thus preventing vertical movement of these plates with the partly swung sash. These spring-pressed friction catches 113, and 58 on the upper sash 50, thus provide means for locking the shield plates 47 and 48 along with their partly swung sashes 49 and 50, respectively, in position.

I also provide handle mechanism with catch means thereon for locking the sash in its closed position, and so arranged that the catch will be automatically released by grasping the handle, for opening the sash. This mechanism comprises a casing 115 connected to casing 106 and mounted in a pocket in the meeting rail of the lower sash 49 (see Figs. 1, and 18 to 21), and a yoke-like handle 116 pivoted therein, carrying an angle member which includes an arm 117 extending into and through said casing and an arm 118 extending transversely therefrom and having a hook 119 at its end to engage behind a lug or notched portion 120 on shield plate 47. By grasping this handle to pull the sash open the hook 119 drops from behind lug 120, as best indicated in Fig. 20, thus releasing the sash from the shield plates for swinging it therein.

I furthermore provide means for screening the opening formed between the meeting rails of the two sashes, or between the free end of the swung sash and the fan means at the sides thereof. This means preferably includes an automatically rolled screen 121 mounted in the meeting rail of one sash, as the upper sash 50, and having means for being releasably connected to the meeting rail of the other sash, said means preferably including a rail 122 attached to the free end of the screen and engaging under the curved end 123 of a plate 124 attached to the meeting rail of the other sash 49, as best shown in Figs. 9, 10 and 14. A spring member or strip 125 automatically moves under rail 122 to hold it engaged with curved end 123 as soon as the sash 49 is being swung open, so as to draw and unroll the screen automatically by the swinging of the sash. When the opened sash is returned to its closed position, then a curved closing plate 126 of resilient material, mounted on the meeting rail of the upper sash and closing the pocket therein which houses the screen, engages a cam lug 127 on spring strip 125 to press back said strip from under rail 122, and at the same time said plate engages under said rail to support it; thus automatically permitting the closed lower sash 49 to be slid upward in the frame along with the attached plate 124 and strip 125, clear from rail 122 and the screen. When the sash is dropped, then the curved end 123 of plate 124 again automatically engages the rail 122 to unroll the screen upon swinging of the sash.

My means provided for locking the sashes, and especially the swingable sash, in the closed position and also in various open positions, comprises a pair of spreading arms 128 having a hinge 128' in each and being connected by a pivot element 129 which has a plate 130 forming its lower head and containing a notch for receiving a spring-pressed friction catch 131, movable in a case 132 set into the meeting rail of the upper sash, when said sash is closed. An arm 133 is swingably connected to arms 128, on pivot element 129, and has a catch or hook 134 and a head 135 at its end, said hook engaging a curved ridge 136 on a plate 137 which is fastened on the meeting rail of the lower sash. A normally concealed or secret friction catch 138, with a knob 139, is slidably mounted in said plate for engaging in a bore in said head 135 to lock said swingable locking arm 133 fast on ridge 136, with the sash either closed or open. The arms 128 have locking pins, preferably in the form of thumb screws, 140, extending through holes in said arms and into threaded holes 141 in channeled bars or arms 142 which extend from a top yoke portion on said case 132, over the meeting rail of the upper sash. A filler plate or member 143 with a threaded opening may also be provided for engaging the threaded end of said locking pin or screw 140, to aid in steadying the pin and in retaining it in position, said plate being slidable in the channel portion of said channel bar 142. This arrangement permits my swingable sash to be locked securely and burglar-proof in its closed and in its various open positions.

Although I have shown my invention in a certain form in this application, various changes and modifications in the construction may be resorted to, and are intended to be included herein, as far as warranted by the existing prior art.

What I claim as my invention and desire to secure by Letters Patent is:

1. A window construction having partition means and shield plates with concealed cables slidable with the sash along said means, and combination stops and casing portions swingable with the sash in said plates, all arranged for slidably and swingably mounting the sash, and also adapt the sash as a window shield.

2. A window construction comprising partition means and stops for slidably mounting a pair of sashes, said partition means being flanged for concealing the cables of the sashes and means cooperating with said partition means and stops for swinging one of said sashes and its companion stops.

3. A window construction comprising means for slidably mounting the sashes and for tilting the lower sash into the room to act as a window shield, and perforated fan shields for closing the openings at the sides of the swung sash.

4. A window construction comprising a sash and combination casing portions and stops therefor, means for swingably mounting said sash and casing portions with stops, and unfoldable means for shielding the openings at the sides of the swung sash.

5. A window construction comprising a box frame with double rabbeted side jambs arranged for receiving sashes of different widths and having a dove-tailed ledge member for anchoring it into the wall, partition means for sliding said sashes, and means on the narrower sash to slide therewith along said partition means and to swing therein through the partition means.

6. A window construction comprising a sash swingable and slidable in the frame, screening means for automatically spanning the opening when the sash is swung, and means for automatically releasing said screening means from the sash when said sash is slid in the frame.

7. A window construction comprising a swingable sash, an automatically rolled screen, and spring means for automatically connecting said screen to said sash to unroll it when said sash is swung open but arranged for readily disconnecting said screen and sash.

8. A window construction comprising a pair of sashes and means for slidably and swingably mounting them, a screen mounted in the meeting rail of one sash to automatically roll up therein, and means for attaching it to the other sash to unroll as the sashes separate.

9. A window construction comprising a pair of sashes and means for mounting them to slide and to swing in the frame, and a screen with means for mounting it on one sash and detachably connecting it to the other sash as same is swung open but to be automatically released as the same is slid along the first sash.

10. A window construction comprising a slidably and swingably mounted sash having unfoldable means at its sides thus serving the purpose of a window shield, and a screen attached to the free end of the sash to move and cover the space between said sash and means during the swinging of the sash.

11. A window construction comprising means for swingably and slidably mounting a pair of sashes, a screen mounted in the meeting rail of one sash and having means for releasably connecting it to the other sash to travel therewith as said sash is opened, and fan shields at the sides of the last said sash, said screen and shields being released from said sash as it is slid in the frame.

12. A window construction comprising a swingable sash and a swingable combination casing portion and stop, a hinge for the sash, and a hinge for the stop being spring-held and slidable with the swinging stop, away from the sash hinge, during the swinging of the sash.

13. A window construction comprising a swingable sash, and a casing mortised into the rail of one sash and containing a handle with catch means for automatically locking said sash, said means being automatically released by grasping said handle for opening said sash.

14. A window construction comprising flanged partition means for slidably mounting a pair of sashes, shield plates with invisible cables on the sashes to slide therewith along the partition means, said cables being hidden by said flanges, and friction hinge means on said plate for swinging said sashes in said shield plates.

15. A window construction comprising a swingable sash, means for sliding the sash and including shield plates in which the sash is pivoted, and friction hinge means on said plates and releasably connected to the sash to permit removal of said sash therefrom.

16. A window construction comprising mechanism for slidably and swingably mounting a sash and to permit ready removal of said sash, unfoldable means for shielding the side openings of the swung sash, and hinge means with friction means on said mechanism for retaining said sash in various positions of opening, thus providing an adjustable window shield from said mechanism and the sash.

17. A window construction comprising mechanism for swingably supporting a sash and to permit sliding the sash therefrom, and a friction hinge thereon with toggle links, thus to retain the sash in various open positions and to permit ready removal of said sash from the mechanism.

18. A window construction comprising mechanism for swingably mounting a sash in the frame, a member attached to the sash and a member attached to the frame, and a friction hinge for holding the sash in various open positions and including a pair of links frictionally connected together and frictionally attached to said members.

In testimony whereof I have signed my name to this specification.

HARRY B. STEIN.